(12) United States Patent
Cavage et al.

(10) Patent No.: US 8,776,190 B1
(45) Date of Patent: Jul. 8, 2014

(54) MULTIFACTOR AUTHENTICATION FOR PROGRAMMATIC INTERFACES

(75) Inventors: Mark Joseph Cavage, Seattle, WA (US); Bradley Jeffery Behm, Seattle, WA (US); Luis Felipe Cabrera, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 716 days.

(21) Appl. No.: 12/955,519

(22) Filed: Nov. 29, 2010

(51) Int. Cl.
  *G06F 7/04* (2006.01)

(52) U.S. Cl.
  USPC ............ 726/5; 713/150; 713/155; 713/181; 380/255; 380/260; 380/276

(58) Field of Classification Search
  USPC ............ 726/5; 380/255, 260, 276; 713/150, 713/155, 181
  See application file for complete search history.

(56) References Cited

U.S. PATENT DOCUMENTS

| 2008/0189549 A1* | 8/2008 | Hughes ........................ 713/171 |
| 2010/0064354 A1* | 3/2010 | Irvine ............................. 726/5 |
| 2011/0016320 A1* | 1/2011 | Bergsten et al. .............. 713/170 |
| 2011/0083018 A1* | 4/2011 | Kesanupalli et al. ......... 713/186 |
| 2012/0054842 A1* | 3/2012 | Urios Rodriguez et al. ...... 726/6 |

FOREIGN PATENT DOCUMENTS

WO   WO 2010/084209   *   7/2010

* cited by examiner

*Primary Examiner* — Jason K. Gee
*Assistant Examiner* — Sharif E Ullah
(74) *Attorney, Agent, or Firm* — Kilpatrick Townsend & Stockton LLP

(57) ABSTRACT

Systems and methods provide logic that validates a code generated by a user, and that executes a function of a programmatic interface after the user code is validated. In one implementation, a computer-implemented method performs a multifactor authentication of a user prior to executing a function of a programmatic interface. The method includes receiving, at a server, a user code through a programmatic interface. The server computes a server code in response to the user code, and compares the user code to the server code to determine that the user code corresponds to the server code. The server validates the user code and executes a function of the programmatic interface, after the user code is validated.

30 Claims, 9 Drawing Sheets

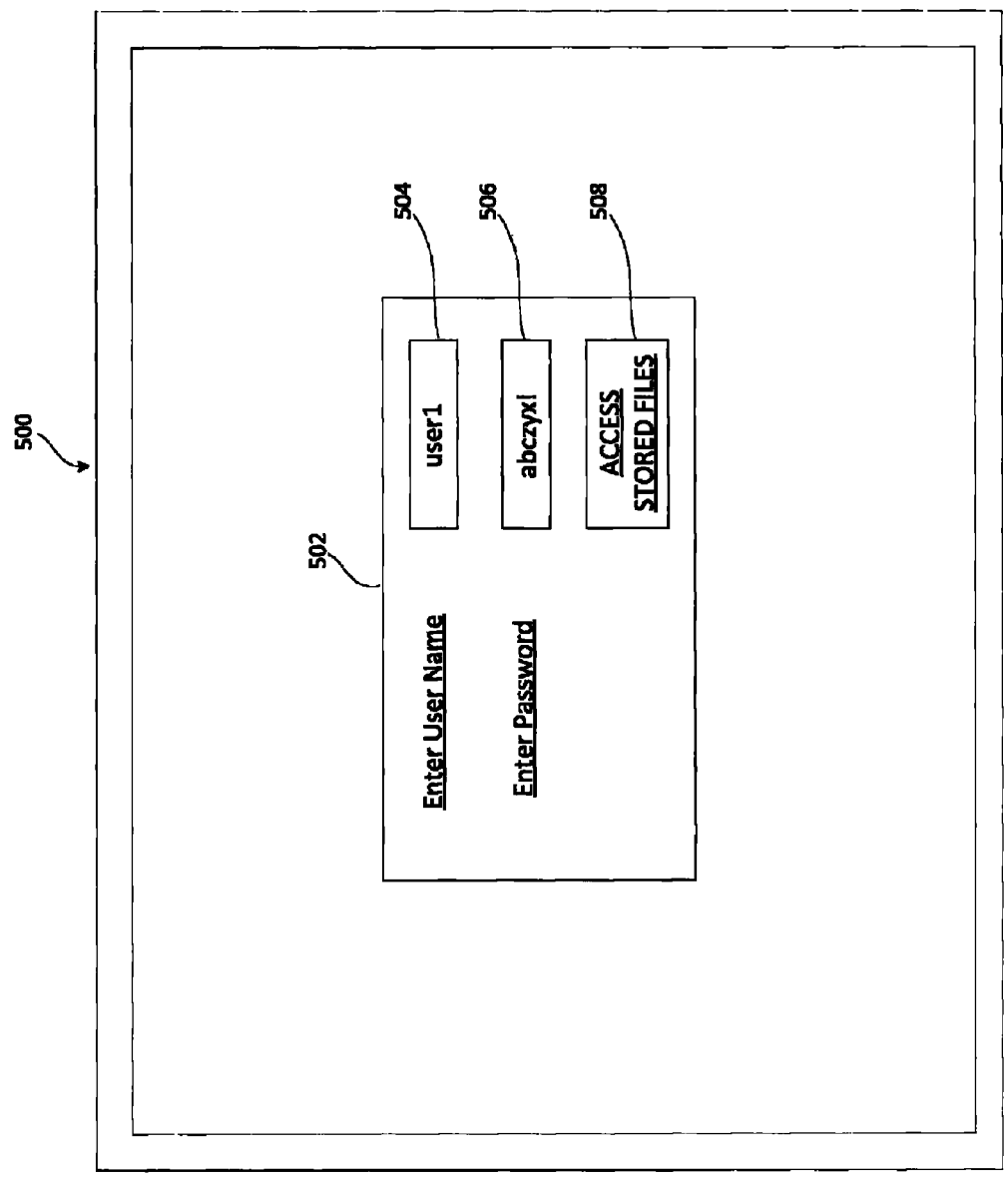

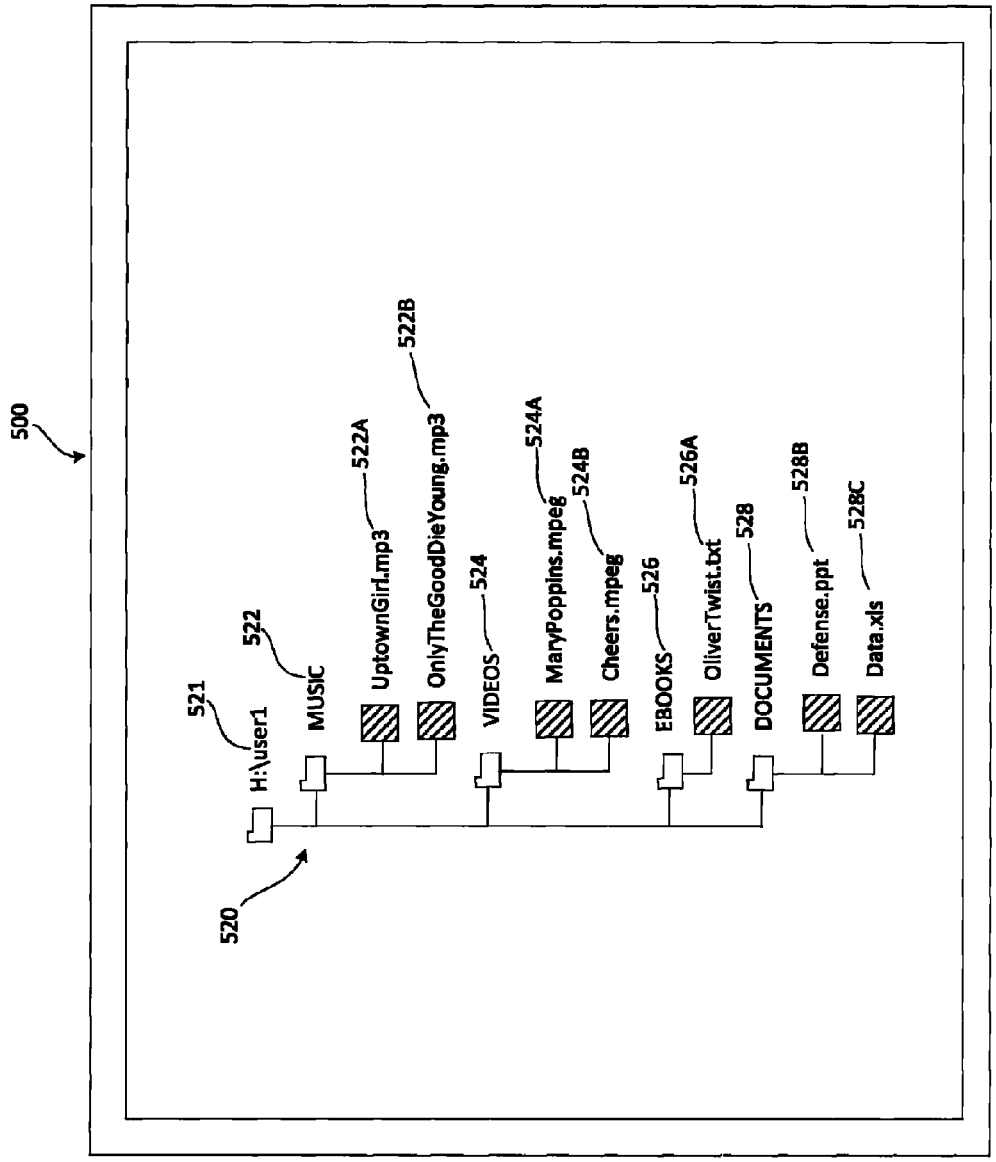

MULTIFACTOR AUTHENTICATION FOR PROGRAMMATIC INTERFACES

BACKGROUND

Remote, network-accessible entities offer a wide variety of electronic content and services to a variety of different devices, including personal computers (PCs), electronic book viewers, portable digital assistants (PDAs), mobile telephones, pocket PCs, smart phones, televisions, set-top boxes, digital video recorders (DVRs), and gaming consoles, among others. These devices often access various remotely-accessible resources, such as various web pages and web services. Such resources may be, for example, associated with online stores, or other providers of audio/visual content, software programs, digital books, or other electronic content.

Today, providers of these resources sometimes require that users authenticate themselves in order to access particular resources. For example, web pages may include information associated with billing data, purchase histories, personal information, or stored content that can be protected using these techniques. Likewise, in addition to protecting content, it may be desirable to protect against unauthorized use of various web services, particularly when the use of such services are charged on a pay-per-use basis. While such remotely-accessible resources may employ authentication schemes to reduce unauthorized access, hackers and other malicious parties sometimes identify and exploit the inherent weaknesses of existing authentication schemes to obtain access to secured consumer information. Therefore, systems and methods are needed to overcome the limitations of traditional processes that authenticate users.

BRIEF DESCRIPTION OF THE DRAWINGS

The accompanying drawings, which are incorporated in and constitute a part of this disclosure, illustrate various disclosed embodiments. In the drawings:

FIGS. 5A-5E are user interfaces that depict an application of the illustrative methods of FIGS. 3 and 4.

DETAILED DESCRIPTION

Disclosed embodiments implement a multifactor authentication process to provide an enhanced level protection to programmatic interfaces associated with remotely-accessible, secured resources of a network. As an example, a user may transmit an authentication credential to a resource server in an attempt to access content stored within, for example, a cloud-computing environment. After validation of the authentication credentials, the user may request a particular operation be performed on the content, such as deleting an element of content, adding an element of content, or changing a name or location of the element of content. However, prior to granting the user access to the content, the resource server may implement a multifactor authentication process to provide an enhanced level of security to the remotely-accessible resources.

To facilitate the multifactor authentication process, a user code associated with a shared secret may be generated by a user device. The user code and the authentication credential may be transmitted to the resource server with a request for a remotely-accessible resource. The resource server, after receiving the request, may forward the authentication credentials and the user code to an authentication server, which executes the multifactor authentication process. The authentication server may access a server copy of the shared secret, and subsequently compute a corresponding server code. The user code and the server code may each represent strings of characters having a predetermined length, and each may be based on an application of a hash function to respective values of a shared secret and a counter.

For example, the user device may compute the user code by applying the hash function to a value of a shared secret and a value of a user counter identified by the user device. Similarly, the authentication server may obtain values of the shared secret and a server counter, and may compute the server code through an application of the hashing function to the obtained values. The authentication server may obtain the values of the shared secret and the server counter from a locally-accessible storage medium, or alternatively, the values of the shared secret and the counter may be obtained from a remotely-accessible repository or distributed hash table.

The authentication server may compare the user code to the server code and validate the user when the user code matches the server code. After validating the user code, the authentication server may transmit a signal indicating a successful authentication to the resource server, which may execute a function of a programmatic interface consistent with the operation requested by the user. As an example, the resource server may execute a call to a web service associated with the data repository to modify one or more elements of stored content according to a request of the user.

Figure 1:
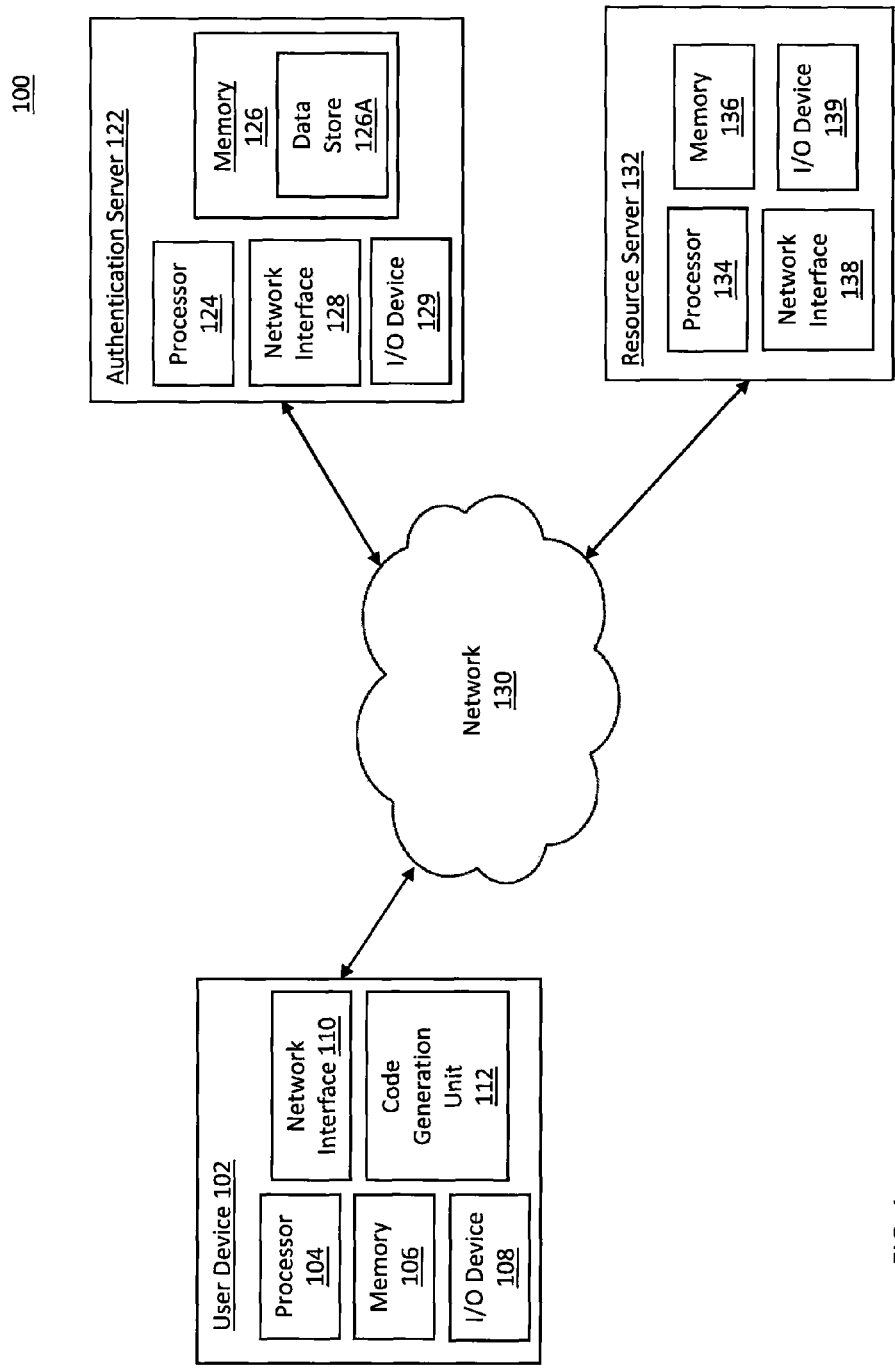
FIG. 1 is a block diagram of an illustrative architecture of a system.

FIG. 1 is a diagram of an illustrative architecture for a computing system 100, consistent with disclosed embodiments. In FIG. 1, system 100 includes a network 130 that interconnects a user device 102, an authentication server 122, and a resource server 132. System 100 may provide functionality that enables resource server 132 to perform a requested operation in response to a multifactor authentication process executed by authentication server 122. Although described in terms of a single authentication server, a single resource server, and a single user device, system 100 may include any additional or alternate number of these components. Furthermore, one or more of the components of system 100 may be combined and/or divided into subcomponents.

User device 102 may include, but is not limited to, a general purpose computer, such as a laptop computer, a stand-alone personal computer (PC), a tablet PC, a server, and a mainframe computer. Additionally, user device 102 may include, but is not limited to, a personal digital assistant (PDA), a portable navigation device, a mobile phone, a smart phone, an electronic book viewer, and any additional or alternate computing device operable to transmit and receive data across network 130, and able to display data received from authentication server 122 and resource server 132. User device 102 may also include a number of additional devices configured to transmit and receive data across network 130 including, but not limited to, a television, a set-top box in communication with a television, a digital video recorder (DVR), and a gaming console.

User device 102 may include a processor 104, a memory 106, an input and output (I/O) device 108, a network interface 110 for communicating across network 130, and a code generation unit 112. Processor 104 may be configured to execute instructions and to process data to perform one or more functions associated with system 100, such as the illustrative methods of FIGS. 3 and 4, described below.

Memory 106 may include one or more memory devices that store data, including, but not limited to, random access memory (RAM), read-only memory (ROM), a magnetic storage device (e.g., a hard disk), an optical storage medium (e.g., a CD- or DVD-ROM), a high-definition optical storage medium, an electronic storage device (e.g., EPROM or a flash drive), and/or other data storage devices known in the art. Memory 106 may store an operating system, such as MacOS, Windows, or Linux, and may also include one or more application programs, such as word processing, database programs, spreadsheet programs, presentation programs, and graphics programs, and/or other programs capable of generating documents or other electronic content. Memory 106 may also include browser applications capable of rendering standard Internet content, such as Netscape Navigator, Microsoft Internet Explorer, and/or Mozilla Firefox. Application programs may be implemented using applets, plug-ins, modules, widgets, and/or any other software components.

Input/output (I/O) device 108 may include one or more components that allow a user of device 102 to interface with applications executing on user device 102. For example, I/O device 108 may include devices such as a keyboard, a keypad, a mouse, a touch pad, a touch screen, a microphone, an accelerometer, a camera, and/or any other user input device consistent with user device 102. I/O device 108 may also include, but is not limited to, a display (e.g., an LCD, a CRT display, electronic ink, or a plasma display), a printer, a speaker, and/or any other output device consistent with user device 102.

Network interface 110 may include any communication device for sending and receiving data across network 130, including, but not limited to, a modem, a transceiver, a network communication card, a satellite dish, an antenna, or another network adapter capable of transmitting and receiving data over network 130.

Code generation unit 112 may be configured to generate a dynamically-changing sequence of characters, digits, or combinations thereof (e.g., a "user code") that facilitate a multifactor authentication process. For example, the user code may be six character or digits in length. However, user codes consistent with the disclosed embodiments are not limited to such illustrative lengths, and in additional embodiments, the user code may be of any additional or alternate length appropriate to code generation unit 112 and to authentication server 122.

As depicted in FIG. 1, code generation unit 112 may be incorporated into user device 102, and may be responsive to one or more applications executing on user device 102. Alternatively, code generation unit 112 may be a device (e.g., an authentication token) separate from user device 102 and in communication with user device 102, e.g., through a USB port. In such an embodiment, code generation unit 112 may constitute a device configured to be transported by the user (e.g., as a key fob or other readily-movable article).

Network 130 may represent any form or medium of digital data communication. Examples of network 130 include a local area network ("LAN"), a wireless LAN, e.g., a "WiFi" network, a wireless Metropolitan Area Network (MAN) that connects multiple wireless LANs, and a wide area network ("WAN"), e.g., the Internet, a private network, an intranet, and a cloud computing network. The Internet may include any publicly-accessible network or networks interconnected via one or more communication protocols, including, but not limited to, hypertext transfer protocol (HTTP) and transmission control protocol/internet protocol (TCP/IP). Moreover, network 130 may also include one or more mobile device networks, such as a GSM network or a PCS network, that allow mobile devices to send and receive data across network 130 via applicable communications protocols, including those described above.

Authentication server 122 may be a special or general purpose computer (e.g., a personal computer, network computer, server, or mainframe computer) having one or more processors that may be selectively activated or reconfigured by a computer program. Furthermore, authentication server 122 may be incorporated as a node in a distributed network. For example, authentication server 122 may communicate via network 130 with one or more additional servers (not shown), which may enable authentication server 122 to distribute processes for parallel execution by a plurality of servers.

In an additional embodiment, authentication server 122 may be associated with a node of a decentralized, highly-scalable distributed computing system, which may provide a distributed hash table. The distributed hash table may be configured to provide shared cryptographic values to authentication server 122. For example, authentication server 122 may be associated with a node corresponding to a particular geographic region (e.g., the New England region of the United States, or alternatively, the United Kingdom).

Referring back to FIG. 1, authentication server 122 may include a processor 124, a memory 126, a network interface 128, and an I/O device 129 that may be similar in function to corresponding components of user device 102. Memory 126 may also include a data store 126A.

Data store 126A may include, for example, information associated with one or more users, e.g., a user of user device 102, within system 100. In an embodiment, data store 126A may include a plurality of individual data records associated with respective users within system 100, such as data record 200 of FIG. 2. However, data store 126A is not limited to an individual record, and in additional embodiments, data store 126A may include any additional or alternate number of records.

Figure 2:
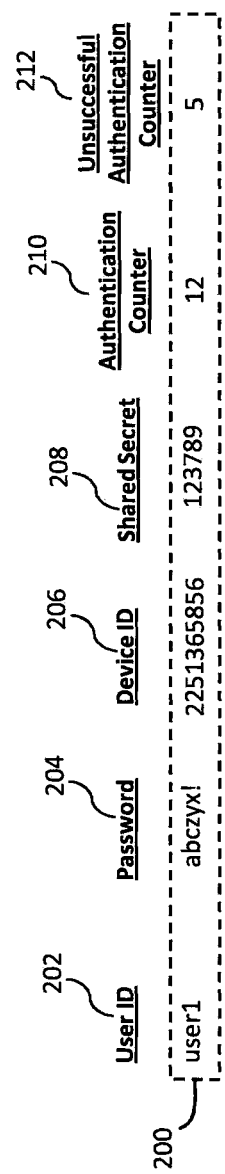
FIG. 2 is an illustrative data structure that may be stored within the authentication server shown in FIG. 1.

As shown in FIG. 2, data record 200 may include information that facilitates an application of a multifactor authentication process to a user. For example, the information may include a user identifier (e.g., user ID 202), a corresponding password 204, an identifier of a device of the user (e.g., a device ID 206), and a shared secret 208 that may be distributed to authentication server 122 and the user associated with user ID 202.

Data record 200 may further include a first counter (e.g., login counter 210), that identifies a total number of authentication attempts, both unsuccessful and successful, that reference the user ID 202. As described below in reference to FIG. 4, authentication server 122 may leverage login counter 210 to compute a server code using, for example, a HMAC-based one-time password algorithm.

Data record 200 may further include a second counter (e.g., unsuccessful login counter 212), which identifies a number of unsuccessful authentication attempts that reference user ID 202. For example, an unauthorized party (e.g., a hacker), may repeatedly attempt to access an account of a user by guessing that user's password or code. In such embodiments, authentication server 122 may use unsuccessful login counter 212 to track the number of unsuccessful attempts, and subsequently block future authentication attempts that reference user ID 202 after the number of unsuccessful attempts exceeds a maximum number.

For example, as depicted in FIG. 2, a user referenced by data record 200 may be associated with a user ID of "user1,"

a password of "abczyx!," and a user device (e.g., user device 102) having a device ID of "2251365856." The user may be assigned a shared secret having a value of "123789," and may be associated with an authentication counter of "12" and an unsuccessful authentication counter of "5." As such, authentication counters 210 and 212 associated with data record 200 indicate that twelve total authentication attempts reference the user ID "user1," and the five of the twelve attempts have been unsuccessful.

Although described in terms of user ID 202, password 204, device ID 206, shared secret 208, and login counters 210 and 212, records within user data store 126A are not limited to such illustrative information. In additional embodiments, user device store 126A may include a subset of this information, or additional or alternate information.

One or more records of user data store 126A (e.g., data record 200), may be generated in response to a registration process. For example, authentication server 122 may prompt a user to select a user ID and password, which may be entered into an interface of a user device (e.g., user device 102), and transmitted to authentication server 122. However, the generation of data record 200 by authentication server 122 is not limited to such illustrative processes, and in additional embodiments, authentication server 122 may generate or populate data record 200 using any additional or appropriate technique.

In a further embodiment, authentication server 122 may obtain elements of one or more records of user data store 126A (e.g., shared secret 208 and login counters 210 and 212 of data record 200) from a remotely-accessible web server or data repository using, for example, an appropriate application programming interface (API) call across network 130. Additionally or alternatively, values of elements of one or more records of user data store 126A may be obtained by authentication server 122 from corresponding distributed hash tables accessible to authentication server 122.

Referring back to FIG. 1, resource server 132 may be a special or general purpose computer (e.g., a personal computer, network computer, server, or mainframe computer) having one or more processors that may be selectively activated or reconfigured by a computer program. Furthermore, resource server 132 may be incorporated as a node in a distributed network. For example, resource server 132 may communicate via network 130 with one or more additional servers (not shown), which may enable resource server 132 to distribute processes for parallel execution by a plurality of servers.

Resource server 132 may include a processor 134, a memory 136, a network interface 138, and an I/O device 139 that may be similar in function to corresponding components of user device 102. Memory 126 may also store an operating system, such as MacOS, Windows, or Linux, and may also include one or more application programs that, when executed by processor 134, generate a web service that may interact with one or more additional servers within network 130, such as authentication server 122, using appropriate calls to and from programmatic interfaces, such as application programming interfaces (APIs).

Figure 3:
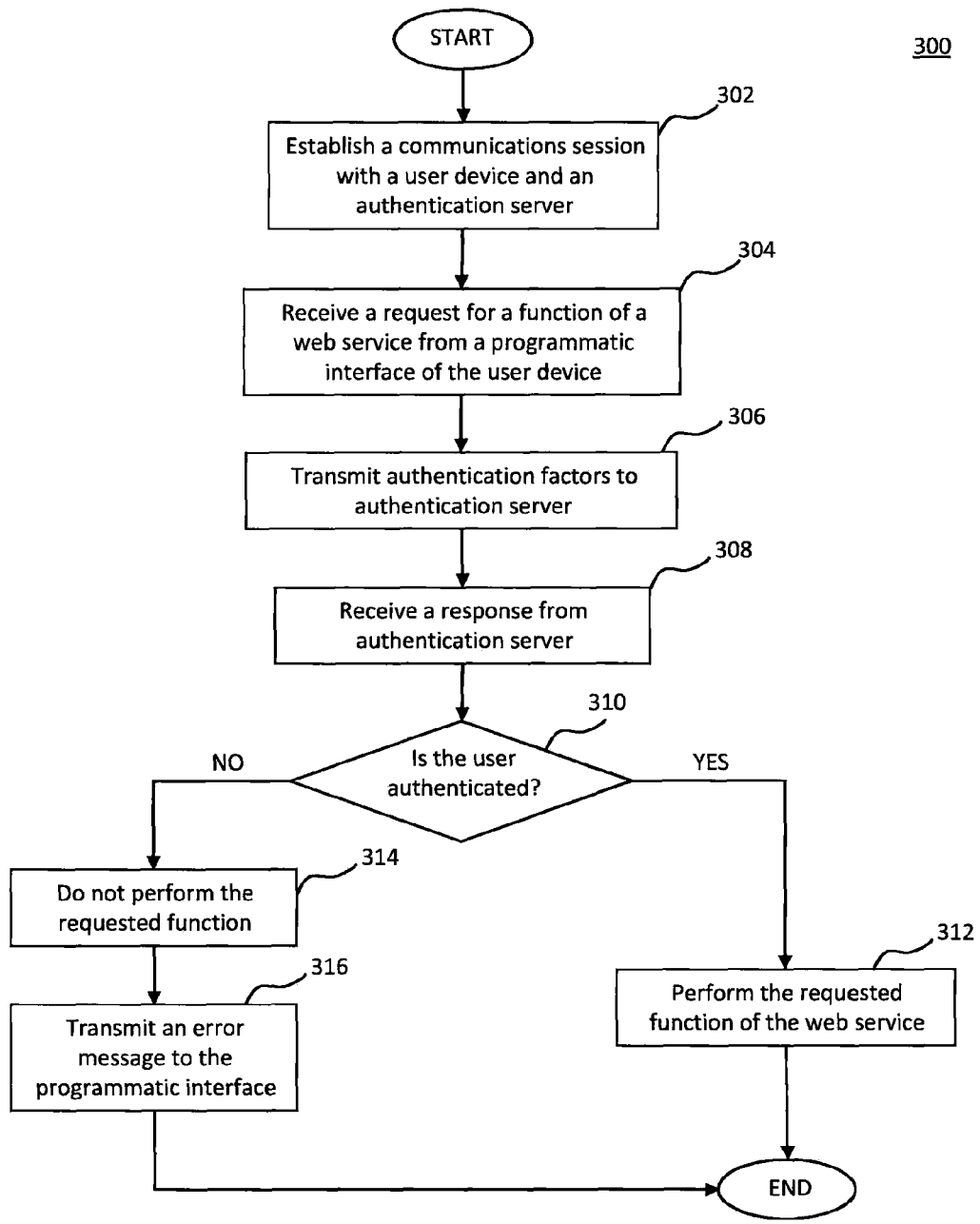
FIG. 3 is a flow diagram of an exemplary method for accessing a web service through a programmatic interface.

FIG. 3 is a flow diagram of an illustrative routine 300 for accessing a web service through a programmatic interface, consistent with disclosed embodiments. As described above, system 100 provides functionality that enables a server (e.g., resource server 132) to receive a request for a function of a web service from a user device (e.g., user device 102 of FIG. 1) through a programmatic interface, and to authenticate the received request by accessing an authentication server (e.g., authentication server 122 of FIG. 1) over network 130 through a call to an appropriate programmatic interface, such as an API. Routine 300 provides further details describing how resource server 132 interacts with user device 102 and authentication server 122 over network 130 to grant the access to a web service based on a multifactor authentication of a user.

In block 302, resource server 132 may establish communications sessions with user device 102 and authentication server 122 over network 130. Resource server 132 may establish the communications sessions using authentication techniques associated with any of the communications protocols outlined above, or using any additional or alternate protocol appropriate to components of system 100. Although described in terms of user device 102, illustrative routine 300 is not limited to a specific number of user devices and authentication servers interacting with resource server 132. In additional embodiments, resource server 132 may establish communication sessions with any additional or alternate number of user devices and authentication servers apparent to one of skill in the art and supportable by network 130.

In block 304, resource server 132 may receive a request to execute an operation (e.g., a function of a web service) from user device 102 over network 130. For example, an application of user device 102 may transmit the request to a programmatic interface (e.g., an API) of resource server 132 automatically without explicit user command, and the received request may include authentication factors that enable a multifactor authentication of a user associated with user device 102. For example, such authentication factors may include, but are not limited to, an authentication credential associated with the user, and a user code generated by user device 102 (e.g., by code generation unit 112 of FIG. 1).

For example, the authentication credential may represent a programmatic means of authentication, including, but not limited to, an access key, a public key certificate, or any other programmatic authentication credential appropriate to the components of system 100. However, the authentication credential is not limited to such programmatic means, and in additional embodiments, the authentication credentials may include one or more user-defined credentials, such as a login name and a password. The user code may, in an embodiment, represent a dynamically-changing sequence of characters, digits, or combinations thereof generated by code generation unit 112 of user device 102. For example, the user code may be six character or digits in length. However, user codes consistent with the disclosed embodiments are not limited to such illustrative lengths, and in additional embodiments, the user code may be of any additional or alternate length appropriate to the code generation unit 112 and to authentication server 122.

Prior to executing the requested operation of function, resource server 132 may request that authentication server 122 perform a multifactor authentication of the user based on the received authentication factors. Referring back to FIG. 3, in block 306, resource server 132 may transmit the received authentication factors to authentication server 122 across network 130. In such embodiments, authentication server 122 may authenticate the user through an application of a multifactor authentication process to the received authentication factors, as described below in reference to FIG. 4.

Figure 4:
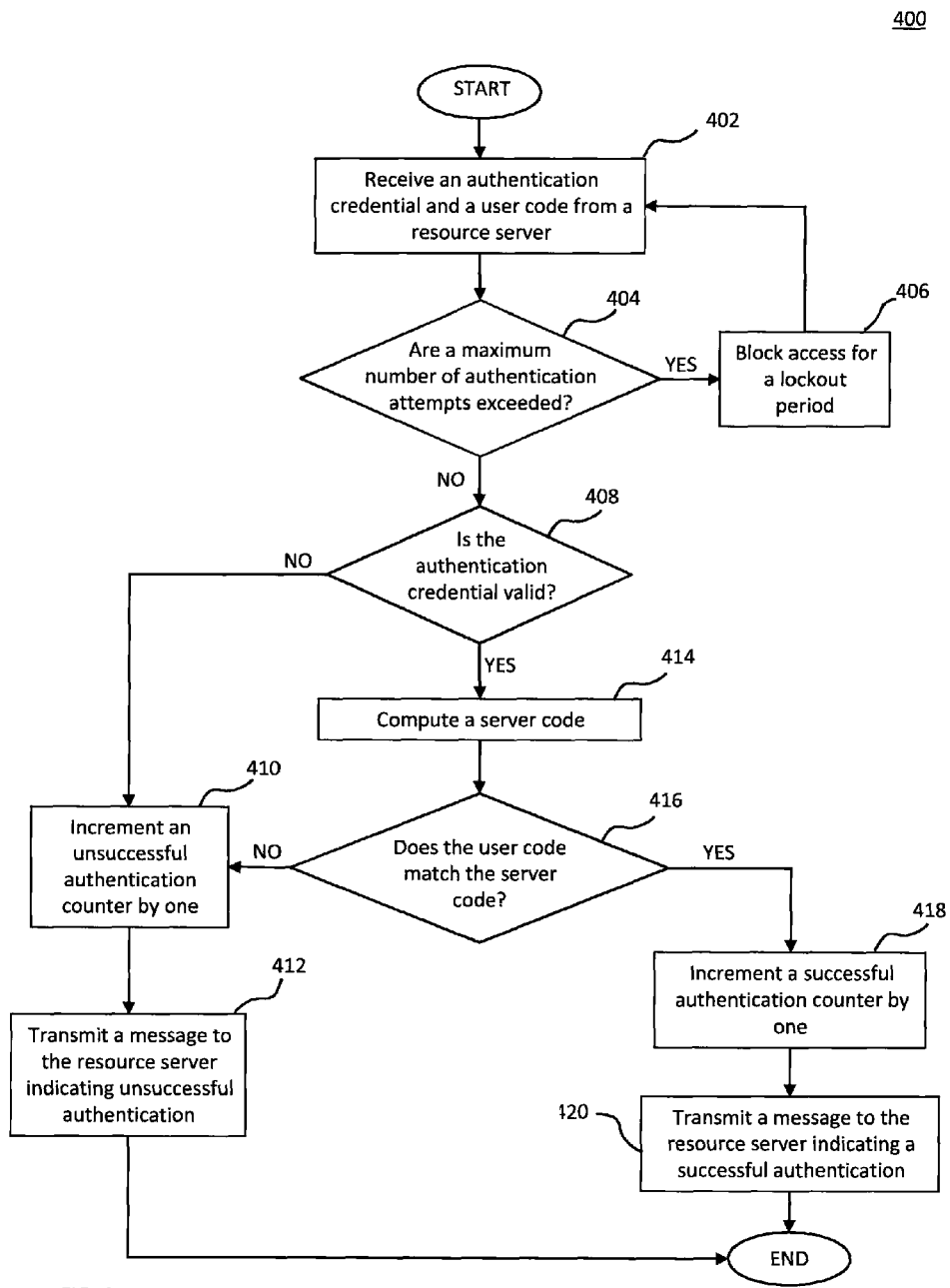
FIG. 4 is a flow diagram of an illustrative method for authenticating a user.

FIG. 4 is a flow diagram of an illustrative routine 400 of a multifactor authentication process for authenticating a user, consistent with disclosed embodiments. Routine 400 provides further details describing how authentication server 122 implements a multifactor authentication of the user (e.g., a user of user device 102) in response to a request received from resource server 132 through a programmatic interface.

In block 402, authentication server 122 may receive a set of authentication factors from resource server 132 through an appropriate programmatic interface (e.g., an API). As discussed above, the received authentication factors may include a programmatic authentication credential, e.g., an access key or a public key certificate, associated with the user of user device 102. For example, such programmatic authentication credentials may be generated by an application executing on user device 102, or alternatively, may be obtained from a data repository accessible to user device 102 across network 130.

As discussed above, the received authentication factors may also include a user code generated by code generation unit 112 of user device 102. The received user code may, in such embodiments, represent a dynamically-changing sequence of characters, digits, or combinations thereof generated by code generation unit 112. For example, the received user code may be six character or digits in length. However, user codes consistent with the disclosed embodiments are not limited to such illustrative lengths, and in additional embodiments, the user code may be of any additional or alternate length appropriate to code generation unit 112 and to authentication server 122.

After receipt of the authentication factors, authentication server 122 may retrieve a data record associated with the user (e.g., data record 200 of user data store 126A in FIG. 1). The data record may be retrieved based on user information incorporated within the programmatic authentication credential (e.g., a subject of a public key certificate) or through additional information received from resource server 132 (e.g., a user identifier associated with a received request).

As described above, the retrieved data may include copies of a server version of a shared secret (e.g., shared secret 208), a first counter indicating a total number of authentication attempts that reference an identifier of the user (e.g., login counter 210), and a second counter indicating a number of unsuccessful authentication attempts that have referenced the identifier of the user identifier (e.g., unsuccessful login counter 212). However, authentication server 122 is not limited to such illustrative data, and in additional embodiments, authentication server 122 may access any additional or alternate set of stored data appropriate to authentication server 122 and the received authentication factors.

In block 404, authentication server 122 may determine whether the number of unsuccessful authentication attempts exceed a maximum number of unsuccessful attempts. For example, the maximum number of unsuccessful authentication attempts may reflect one or more parameters of system 100 (e.g., a number of authentication servers in system 100), one or more parameters of the distributed hash network in which authentication server 122 participates, or any additional or alternate parameter.

For example, in block 404, authentication server 122 may compare the value of the second counter of the retrieved data record (e.g., authentication counter 212 of data record 200) with the maximum number of unsuccessful authentication attempts. If it is determined in block 404 that the maximum number of unsuccessful authentication attempts has been exceeded, then authentication server 122 may prevent authentication attempts that reference the user for a predetermined period of time, i.e., a "lockout period," in block 406. For example, the lockout period may include, but is not limited to, ninety seconds, five minutes, one hour, or any additional or alternate time appropriate to authentication server 122.

The capability of authentication server 122 to block access during this lockout period may substantially reduce the ability of malicious parties, acting individually or through software (e.g., "bots"), to determine the authentication credentials of a user through repeated authentication attempts. After expiration of the "lockout period," authentication server 122 may reset unsuccessful login counter 212 of data record 200 to a value of zero.

If it is determined in block 404 that the maximum number of unsuccessful login attempts has not been exceeded, then authentication server 122 may determine whether the programmatic authentication credential is valid in block 408. For example, and as discussed above, the programmatic authentication credential may include a public key certificate, and the authentication server may process the received public key certificate in block 408 to verify the authenticity of the received credential and the digital signature of user using any of a number of techniques apparent to one of skill in the art and appropriate to authentication server 122.

If it is determined in block 408 that the authentication credential is not verified (e.g., the public key certificate is invalid or has been subject to tampering), then authentication server 122 may identify the authentication attempt as failed. Authentication server 122 may increment the unsuccessful authentication counter associated with the retrieved record by a value of one in block 410 to indicate the failed attempt, and may transmit a message to resource server 132 in block 412 that indicates the authentication attempt has failed.

However, if it is determined in block 408 that the authentication is valid, authentication server 122 may compute a corresponding code (i.e., a "server code") to validate the user code in block 414. As described above, the server code may represent an alpha-numeric sequence having a pre-determined length of six to eight characters, and authentication server 122 may compute the server code through an application of a hashing algorithm to locally-obtained values of a shared secret and an appropriate sever counter. For example, the hashing algorithm applied by authentication server 122 may include one or more of the algorithms associated with the OATH standard, including, but not limited, the one-time password (OTP) algorithms described above.

In an embodiment, in block 414, authentication server 122 may obtain the value of the shared secret (e.g., shared secret 208 of record 200) from a locally-accessible data repository maintained by authentication server 122 (e.g., data store 126A of FIG. 1). Alternatively, authentication server may receive the value of the shared secret from a remotely-accessible web service or distributed hash table across network 130, for example, in response to an appropriate application programming interface (API) call. Authentication sever 122 may subsequently obtain the value of the counter from the locally-accessible storage medium or from the remotely-accessible web service or distributed hash table, and may compute the server code in block 414 through an application of the hashing algorithm to the obtained values of the shared secret and the server counter, as outlined above.

For example, the server counter incorporated within a time-dependent OTP algorithm may represent a system time determined from a system clock of authentication server 122. Alternatively, using an HMAC-based OTP algorithm, authentication server 122 may retrieve a value of an increasing counter from a locally-accessible data repository (e.g., data store 126A of FIG. 1), or a remotely-accessible web service or distributed hash table across network 130 using, for example, a call to an appropriate programmatic interface. The increasing counter may be an authentication counter (e.g., authentication counter 210 of data record 200) representing a number of authentication attempts that reference the user identifier of the user, an unsuccessful authentication counter (e.g., unsuccessful authentication counter 212 of data record 200) representing a number of unsuccessful authentication attempts that reference the user identifier of the user, or any additional or alternate value of an increasing counter associated with the user or user device 102.

Authentication server 122 may compare the user code to the server code in block 416 to determine whether the user code corresponds to the server code. For example, authentication server 122 may determine that the user code matches the server code when the alpha-numeric sequence of the user code matches the corresponding sequence of the server code. Authentication server 122 may validate the user code when that user code matches the server code, as determined in block 416.

If it is determined in block 416 that the user code does not correspond to the server code, authentication server 122 does not validate the user code. Additionally, authentication server 122 may determine that the invalidated user code corresponds to a failed authentication attempt, and may increment the login counters associated with the retrieved data record of the user (e.g., login counter 210 and unsuccessful login counter 212 of data record 200) by a value of one in block 410 to reflect the failed login attempt. Additionally, and as discussed above, authentication server 122 may transmit a message to resource server 132 in block 414 indicating that the authentication attempt has failed.

However, if it is determined in block 416 that the user code corresponds to the server code, then authentication server 122 may validate the user code and authenticate the user. In an embodiment, the validation of the user code indicates that user device 102 and authentication server 122 share a common value of the shared secret and a common value of the counter associated with the hashing algorithm. For example, using an HMAC-based OTP algorithm, the validation of the user code may imply that user device 102 and authentication server 122 are associated with synchronized values of the increasing counter (e.g., the total number of login attempts that reference the user identifier of the user). Alternatively, using a time-based OTP algorithm, the validation of the user code may imply that the system time associated with user device 102 is synchronized with the system time of authentication server 122, and as such, both user device 102 and authentication server 122 share a current view of a "current time."

In block 418, once the user code is validated, authentication server 122 may increment the counters associated with the retrieved data record of the user (e.g., authentication counter 210 of data record 200) by a value of one to reflect the successfully authentication attempt. Authentication server 122 may then transmit a message to resource server 132 in block 420 indicating that the user has been successfully authenticated. Upon transmission of the message indicating the successful authentication attempt in block 420, or alternatively, the transmission of the message indicating the failed authentication attempt in block 412, the multifactor authentication processes of FIG. 4 are complete, and the routine 400 passes back to block 308 of FIG. 3.

Referring back to FIG. 3, in block 308, resource server 132 may receive a response from authentication server 122 that indicates a status of the multifactor authentication of the user (i.e., the message transmitted by authentication server 122 in block 412, or alternatively, in block 420). For example, the response may include a Boolean expression (i.e., "YES" or "NO") indicative of the success of the multifactor authentication process, or alternatively may include any additional or alternate information apparent to one of skill in the art and appropriate to resource server 132 and authentication server 122.

Based on the received response, in block 310, resource server 132 may determine whether the user has been successfully authenticated. If it is determined in block 310 that the user has been successfully authenticated, then resource server 132 may perform the operation requested by the user in block 302. For example, the requested operation may correspond to a function of a web service associated with resource sever 132, and resource server 132 may execute the requested function of the web service in block 312 (e.g., through a call to an appropriate programmatic interface).

Alternatively, if it is determined in block 310 that authentication server 122 has been unable to authenticate the user, then resource server 132 fails to perform the requested operation in block 314. In block 316, resource server 132 generates an error message and transmits that error message to user device 102 over network 130 through an appropriate programmatic interface (e.g., an API).

As described above, resource server 132 may be associated with a web service, which may be accessed by user device 102 using one or more calls to an appropriate programmatic interface (e.g., an application programming interface (API) call). In such embodiments, the multifactor authentication processes of FIGS. 3 and 4 provide enhanced protection of programmatic interfaces associated with web services and other applications executing within network 130.

Furthermore, the illustrative processes of FIGS. 3 and 4 satisfy the requirements of so-called "strong" authentication standards, such as the open OATH standard described above, that recommend authentication schemes that ensure a user code is uniquely assigned to a user over a threshold period of validity. In these disclosed embodiments, the values of the user code and corresponding server code are calculated based on a unique value of a shared secret assigned to the user of device 102 and accessible to authentication sever 122, and a value of a counter that varies in time and in response to actions of the user. For example, if a user code and a server code were validated at a particular server time, e.g., of "13:31:21," a malicious user that might attempt to access the web service using the same code at "13:31:30" would be blocked, as the value of the server code would be computed based on the value of the new time, i.e., "13:31:30," and not "13:31:21."

Although not depicted in FIG. 4, authentication server 122 may store local copies of a server code and a system time. In such embodiments, authentication server 122 may leverage these locally-stored values to validate a received user code when authentication server 122 is unable to access the information needed to compute the server code. For example, in the event of a communications failure or a power failure, authentication server 122 may be unable to access network 130 to obtain the value of the shared secret from a remotely-situated data repository or distributed hash table.

In such embodiments, authentication server 122 may retrieve the local copy of the server code and the server time and may validate the received user code in block 416 of FIG. 4 when the received user code matches the local copy of the server code, and when the server time associated with the local copy of the server code falls within a threshold time period of the current server time of authentication server 122. For example, the threshold time period may represent one second, five seconds, ninety seconds, five minutes, one hour, or any additional or alternate time period.

In an illustrative embodiment, resource server 132 may be associated with one or more geographically-dispersed data repositories within a cloud-based computing environment. For example, such repositories may store content elements of the user of user device 102, and such stored data may include, but is not limited to, digital images, digital videos, digital audio recordings, electronic books, and files comprising structured and/or unstructured text (e.g., word processor, spreadsheet, and presentation documents).

In such embodiments, resource server 132 may be associated with an application that manages stored content within a data repository (e.g., a repository within a cloud computing network). For example, the application may enable the user to upload content, manage previously-uploaded content, and to permanently delete such content from the data repository. In such embodiments, resource server 132 may leverage the processes disclosed above in reference to FIGS. 3 and 4 to provide an enhanced level of authentication to any user attempting to modify content maintained in the data repository, as described below in reference to the illustrative screen shots of FIGS. 5A-5E.

For example, a user of a user device (e.g., user device 102), may execute an application to access a user interface of a repository within the cloud-computing environment that stores the user's electronic content. As discussed above, resource server 132 may be associated with the repository, and may be configured to service requests from the user to manage the stored electronic content after validation by a multifactor authentication process.

FIG. 5A depicts an illustrative interface 402 that may be presented to the user through a screen 500 of user device 102. In FIG. 5A, interface 502 may prompt the user to enter a user identifier into region 504 and a corresponding password into region 506 using, for example, a keyboard, touch pad, by speaking aloud, or any additional or alternate input means. After entering the user identifier and password, the user may click, touch, or otherwise activate "ACCESS STORED FILES" region 508, and user device 102 may locally validate the user, and may subsequently access or generate a programmatic authentication credential (e.g., a public key certificate) associated with the user, which may be transmitted to resource server 132 to provide the requested access.

After receiving the request to access the stored electronic content, resource server 132 may transmit the programmatic authentication credential (e.g., the public key certificate) to authentication server 122 to facilitate a single-factor authentication of the user. If authentication server 122 determines that the programmatic authentication credential is valid, and that the user has not exceeded a maximum number of unsuccessful authentication attempts, then a portion of the stored electronic content associated with the user may be displayed to the user within screen 500 of user device 102, as described below in reference to FIG. 5B.

Figure 5B:
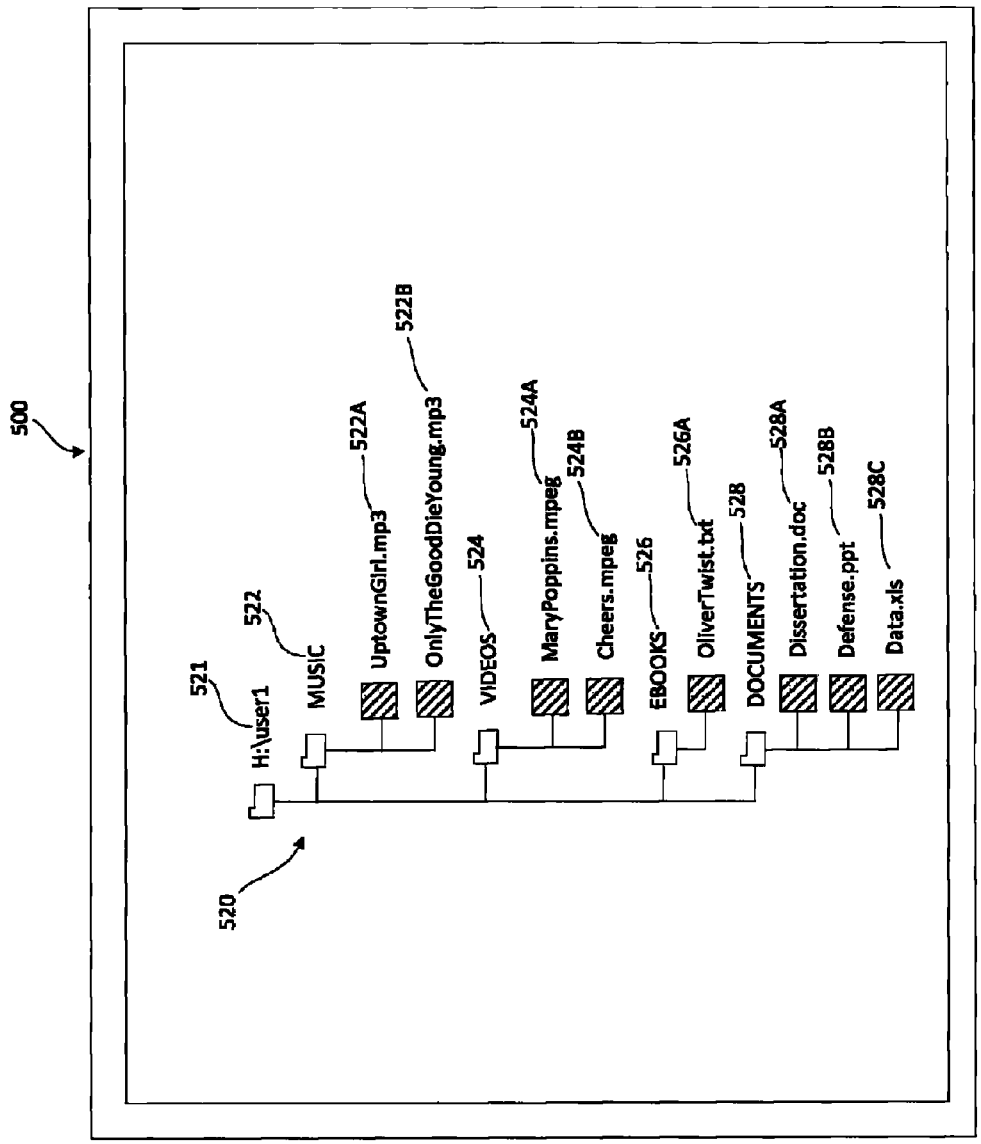

FIG. 5B depicts an illustrative portion 520 of a file system that includes directories associated with the user of user device 102. For example, portion 520 user may be associated with a home directory 521 (e.g., "H:\user1") within a data repository, and home directory 521 may be linked to content elements of the user, and additionally or alternatively, to one or more nested subdirectories that may be linked to content elements of the user. Furthermore, for example, home directory 521 may include a subdirectory 522 associated with digital music of the user (e.g., "MUSIC"), which may be linked to a digital music file 522A (e.g., "UptownGirl.mp3") and to a digital music file 522B (e.g., "OnlyTheGoodDieYoung.mp3").

Home directory 521 may also be linked to a subdirectory 524 associated with digital videos of the user (e.g., "VIDEOS"), a subdirectory 526 associated with electronic books of the user (e.g., "EBOOKS"), and a subdirectory 528 (e.g., "DOCUMENTS") associated with files that include structured and/or unstructured text. For example, a digital video file 524A (e.g., "MaryPoppins.mpeg") and digital video file 524B (e.g., "Cheers.mpeg") may be linked respectively to "VIDEOS" subdirectory 524, an electronic book 526A (e.g., "OliverTwist.txt") may be linked to "EBOOKS" subdirectory 526, and a word processing document 528A (e.g., "Dissertation.doc"), a presentation document 528B (e.g., "Defense.ppt"), and a spreadsheet document 528C (e.g., "Data.xls") may be linked respectively to "DOCUMENTS" subdirectory 528.

The user may desire to perform a particular operation on one or more of the files or subdirectories associated with home directory 521. In order to perform such an operation on a file or a subdirectory, the user may click, select, or otherwise activate a region disposed proximate to the displayed filename or directory name, and the user may select an appropriate operation from a list displayed in a menu or "pop-up" window, as depicted below in FIG. 5C.

Figure 5C:
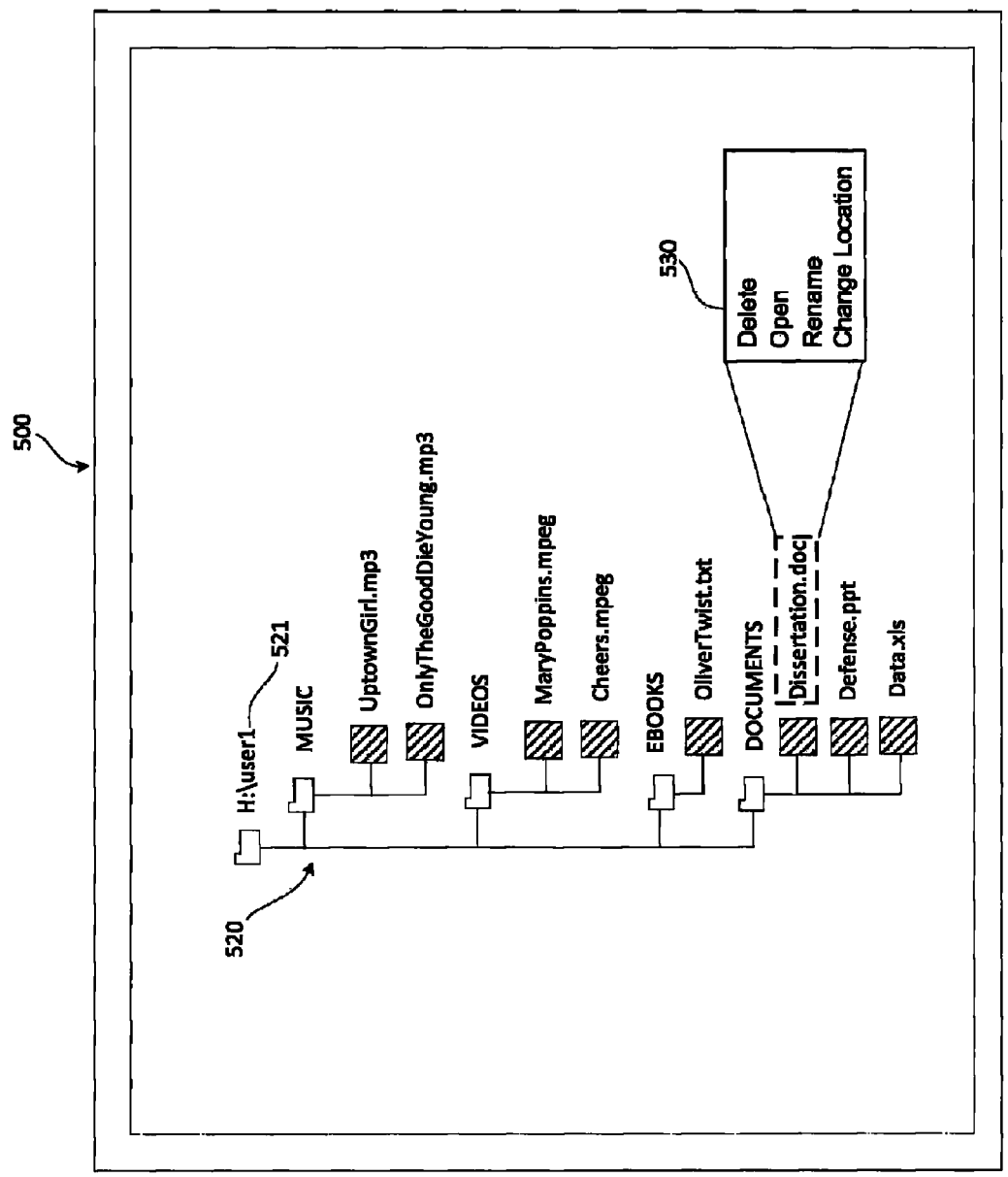
Figure 5D:
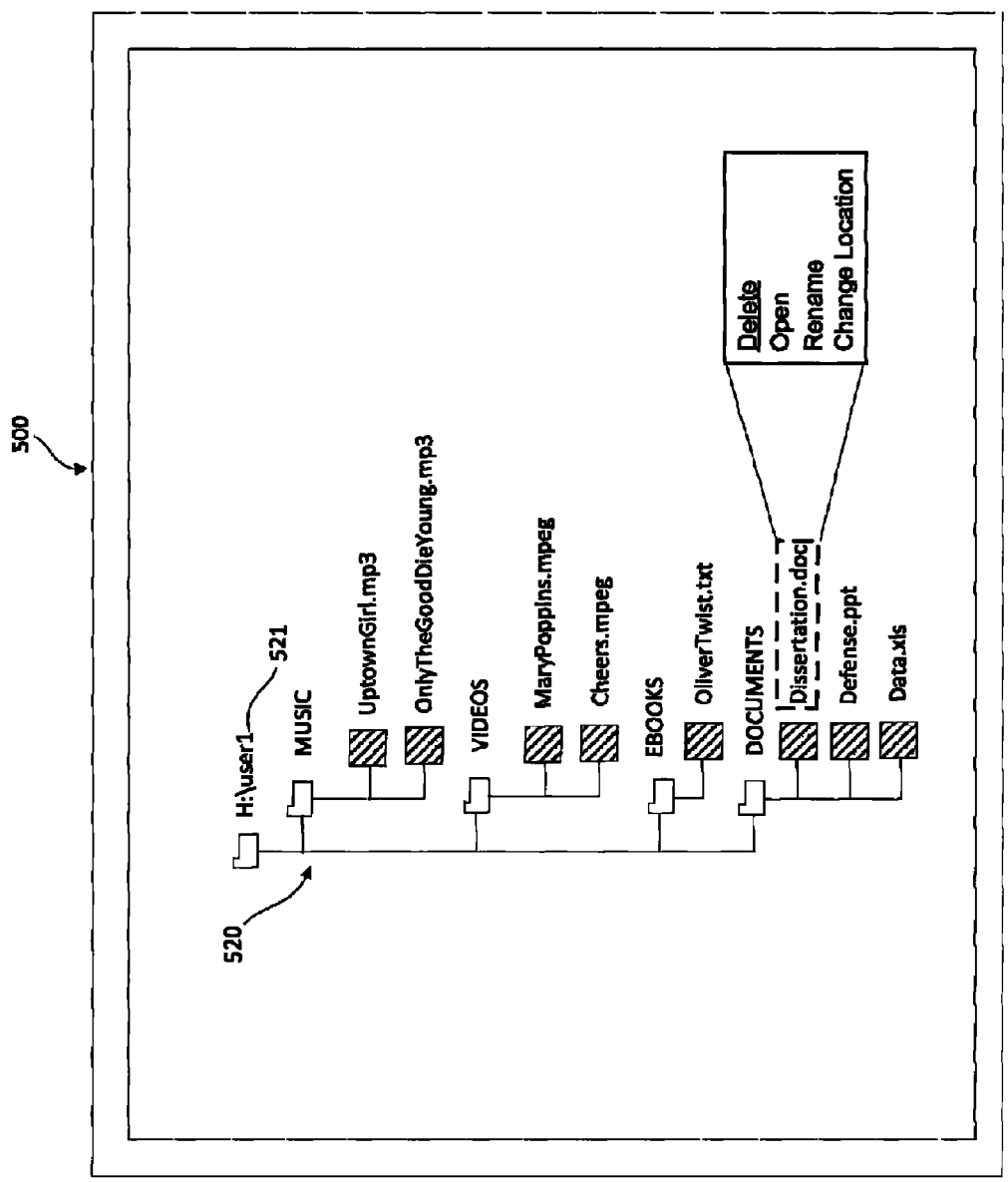

FIG. 5C depicts an illustrative interface from which a user may request a particular operation be performed on selected file or subdirectory within displayed portion 520. As depicted in FIG. 5C, a user has selected a file within displayed portion 520, e.g., "Dissertation.doc," and in response to the selection an additional menu 530 is displayed to the user as a "pop-up" window within display 500. Menu 530 may present the user with one or more operations that may be performed on the selected file. For example, menu 530 may provide the user an opportunity to permanently delete the selected file from home directory 521 (e.g., "Delete"), to open the selected file using an appropriate application program (e.g., "Open"), to change a name of the selected file while maintaining its position with home directory 521 (e.g., "Rename"), and to change a location of the selected file within home directory 521 (e.g. "Change Location").

As depicted in FIG. 5C, the user may select the "Delete" operation from menu 530 in order to permanently delete the selected "Dissertation.doc" file from home directory 521. In response to the selection, code generation unit 112 of user device 102 may generate a user code according to the one-time password algorithms described above, and the user code and the programmatic authentication credential of the user may be transmitted to resource sever 132 with a request to perform the "Delete" operation on the selected file.

Prior to performing the requested operation, resource server 132 may interface with authentication server 122 to perform an enhanced, multifactor authentication of the user based on the received user code and programmatic authentication credential. As described above in reference to block 304 of FIG. 3, resource server 132 may forward the programmatic authentication credential of the user and the user code to the authentication sever 122. Further, as discussed in reference to FIG. 4, authentication server 122 may receive the programmatic authentication credential and user code in block 402, may determine that the programmatic authentication credential is valid in block 408, may compute a corresponding server code in block 414 using one or more of the algorithms outlined above, and may subsequently validate the user code through a comparison against the server code in block 416.

If authentication server 122 validates the received user code in block 416, then authentication server 122 may transmit a signal indicative of the successful authentication of the user to resource server 132 in block 420. Upon receipt of the signal indicating a successful multifactor authentication, resource server 132 may execute the requested function of the web service to perform the requested operation and delete the selected "Dissertation.doc" from home directory 521, as depicted in FIG. 5E, which indicates that "DOCUMENTS"

directory 528 now contains only "Defense.ppt" and "Data.xls," but not "Dissertation.doc."

Alternatively, if authentication server 122 fails validates the received user code in block 416, then authentication server 122 may transmit a signal indicative of the failed authentication of the user to resource server 132 in block 412. In response to the signal, resource server 132 may generate an appropriate error message, which may be transmitted to user device 102 through an appropriate programmatic interface and subsequently displayed to the user, for example, in screen 500 of user device 102.

Although the processes of FIGS. 3 and 4 are described in terms of a remote API call that deletes a selected file from a home directory, the disclosed embodiments are not limited to such illustrative operations. In additional embodiments, and after validating a user code, authentication server 122 may initiate call to an application programming interface (API), or any additional or alternate programmatic interface, of a resource service configured to perform any of the operations included within window 530 of FIG. 5C, or any additional or alternate operation compatible with the files linked to home directory 521 of the user.

For example, as discussed above, the call to the API may open the selected file using an application program appropriate to the file or specified by the user (e.g., by selecting the "Open" icon of FIG. 5C), change a filename of the selected file (e.g., by selecting the "Rename" icon of FIG. 5C), and/or change a location of the selected file within a directory structure (e.g. by selecting the "Change Location" icon of FIG. 5C). Further, for example, the call to the API may generate one or more recommendations of electronic content or services associated with the selected file and, additionally or alternatively, may provide the user with an opportunity to purchase or obtain access to one or more services or additional elements of electronic content, for example, that are related to the selected file.

Further, the disclosed embodiments are not limited to resource server (e.g., resource server 132 of FIG. 1) that delegates multifactor authentication processes to corresponding authentication servers (e.g., authentication server 122 of FIG. 1). In additional embodiments. authentication server 122 may execute a multifactor authentication process for a user of a user device (e.g., user device 102) and upon successful authentication, execute a call to a service associated with resource server 132. In such embodiments, authentication server 122 may serve as a gateway that ensures a separation between user device 102 and resource server 132.

Moreover, although described in terms of operations performed on user content stored remotely within a cloud computing environment, the multifactor authentication processes of FIGS. 3 and 4 are not limited to such illustrative applications. In additional embodiments, after validation of a user code, resource server 122 may perform an operation or execute a function of a programmatic interface (e.g., an API) associated with one or more of an online retailer, a financial institution, an actuarial institution, a data repository, a news organization, a social networking application, a provider of electronic content, or any additional or alternate entity without departing from the spirit or scope of the disclosed embodiments.

For example, and in response to the authentication of the user, resource server 132 may execute a call to an API that enables the user to modify billing or shipping information associated with an electronic retailer, including, for example, a current billing address, a current personal address, a current shipping address, or details of a preferred payment method. Furthermore, for example, the call to an API may enable to user to access and modify details of a user account with a utility, financial institution, or actuarial institution, including, for example, a modification to personal information associated with the user account, a modification to a billing cycle of the user account, a selection of paperless statements, or a selection of a payment method.

Additionally or alternatively, the call to the API may grant the user access to a restricted web service, for example, one that is available on a pay-per-user basis. As yet another example, a call to an API associated with a financial institution may enable to user to gain access to multiple years of account statements at a cost, and the successful validation of the user through the multi-factor authentication process may indicate the user's agreement to the cost of the service.

Further, for example, the exemplary processes of FIGS. 3 and 4 are not limited to applications initiated by a user on a user device, e.g., through I/O device 108 of user device 102. In additional embodiments, a request for a function of a web service may be programmatically generated by an application executed in a background of user device 102 by, for example, an operating system (e.g., MacOS, Windows, or Linux), a file system utility, or any additional or alternate application executing on user device 102 without departing from spirit or scope of the disclosed embodiments.

As one of ordinary skill in the art will appreciate, one or more of blocks 302-316 and blocks 402-420 may be optional and may be omitted from implementations in certain embodiments. Furthermore, functionality provided by one or more of blocks 302-324 may be subdivided into multiple blocks.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of non-transitory computer-readable storage media, such as secondary storage devices, for example, hard disks, floppy disks, or CD-ROM, or other forms of RAM or ROM, USB media, DVD, or other high-definition optical storage media.

Computer programs based on the written description and disclosed methods are within the skill of an experienced software developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C#, etc.), Java, C++, Objective-C, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the blocks of the disclosed routines may be modified in any manner, including by reordering blocks and/or inserting additional blocks or deleting blocks. It is intended, therefore, that the specification and examples be considered as illustrative only, with a true scope and spirit being indicated by the following claims and their full scope of equivalents.

What is claimed is:

1. A computer-implemented method for authenticating a user, comprising:
   receiving, at a server, an authentication credential of the user;
   validating the authentication credential;
   receiving, through a programmatic interface at the server, a user code generated by a code generation unit at a user device, wherein:
      the user code comprises a predetermined number of characters, and
      the user code was generated at a first time based on an application of a hashing algorithm to a user value and a user counter, the user value being obtained from the user device;
   computing, at the server, a server code in response to the received user code at a second time, the computing comprising:
      obtaining a server value and a server counter; and
      applying the hashing algorithm to the server value and the server counter to generate the server code;
   comparing the user code to the server code to determine that the user code corresponds to the server code;
   validating the user code when the first time is within a threshold time period of the second time; and
   executing a function of the programmatic interface, after the user code is validated.

2. The method of claim 1, wherein:
   the user counter comprises a value of a login counter maintained by the user device; and
   the server counter comprises a value of a login counter maintained by the server.

3. The method of claim 1, wherein the hashing algorithm comprises an HMAC based one-time password algorithm.

4. The method of claim 1, wherein:
   the user counter comprises a system time associated with the user device; and
   the server counter comprises a system time of the server.

5. The method of claim 1, wherein the hashing algorithm comprises a time-based one-time password algorithm.

6. The method of claim 1, wherein the function of the programmatic interface comprises a call to a web service accessible to the server, the service being configured to perform an operation.

7. The method of claim 6, wherein the service is associated with one or more of a data repository, an online retailer, a financial institution, an actuarial institution, an educational institution, a governmental institution, a news organization, a social networking application, or a provider of electronic content.

8. A computer-implemented method, comprising:
   receiving, at a server, a user code through a programmatic interface, the user code generated at a user device by a code generation unit at a first time;
   computing, at the server, a server code in response to the user code at a second time;
   comparing the user code to the server code to determine that the user code corresponds to the server code;
   validating the user code when the first time is within a threshold time period of the second time; and
   executing a function of the programmatic interface, after the user code is validated.

9. The method of claim 8, further comprising:
   receiving an authentication credential associated with the user, the authentication credential comprising one or more of a programmatic credential, a user identifier, or a password.

10. The method of claim 9, further comprising:
    determining that the authentication credential is valid.

11. The method of claim 8, wherein the computing comprises:
    obtaining a server value and a server counter; and
    applying a hashing algorithm to the server value and the server counter to generate the server code.

12. The method of claim 11, wherein the obtaining comprises:
    obtaining at least one of the server value or the server counter from a service accessible to the server.

13. The method of claim 12, wherein the service accessible to the server comprises a distributed hash table.

14. The method of claim 11, wherein the server counter comprises a value of a login counter maintained by the server, or a system time of the server.

15. The method of claim 11, wherein the hashing algorithm comprises a one-time password algorithm.

16. The method of claim 8, wherein:
    the user code comprises a predetermined number of characters; and
    the user code was generated based on an application of the hashing algorithm to a user value and a user counter.

17. The method of claim 16, wherein the user value is generated at the user device.

18. The method of claim 16, wherein the user counter comprises a value of a login counter maintained at the user device, or a value of a system time of the user device.

19. The method of claim 10, wherein the function of the programmatic interface comprises a call to a web service accessible to the server, the service being configured to perform an operation.

20. The method of claim 19, wherein the web service is associated with one or more of a data repository, an online retailer, a financial institution, an actuarial institution, an educational institution, a governmental institution, a news organization, a social networking application or a provider of electronic content.

21. An apparatus for authenticating a user, comprising:
    a processor for executing program instructions; and
    a memory storing the program instructions, the program instructions being executed by the processor to perform a process to:
       receive a user code through a programmatic interface, the user code generated at a user device by a code generation unit at a first time;
       compute a server code in response to the user code at a second time;
       compare the user code to the server code to determine that the user code corresponds to the server code;
       validate the user code when the first time is within a threshold time period of the second time; and
       execute a function of the programmatic interface, after the user code is validated.

22. The apparatus of claim 21, wherein the program instructions executed by the processor to receive are further executed to:
  receive an authentication credential associated with the user, the authentication credential comprising a programmatic credential, a user name, or a password.

23. The apparatus of claim 22, wherein the program instructions executed by the processor to receive are further executed to:
  determine that the authentication credential is valid.

24. The apparatus of claim 21, wherein:
  the user code comprises a predetermined number of characters; and
  the user code was generated based on an application of a hashing algorithm to a user value and a user counter.

25. The apparatus of claim 24, wherein the user value is obtained from the user device.

26. The apparatus of claim 24, wherein the user counter comprises a value of a login counter maintained by the user device, or a value of a system time of the user device.

27. The apparatus of claim 21, wherein the program instructions executed by the processor to compute are further executed to:
  obtain a server value and a server counter; and
  apply a hashing algorithm to the server value and the server counter to generate the server code.

28. The apparatus of claim 27, wherein the server counter comprises a value of a login counter maintained by the server, or a system time of the server.

29. The apparatus of claim 21, wherein the function of the programmatic interface comprises a call to a service accessible to the server, the service being configured to perform an operation.

30. The method of claim 1, wherein the authentication server is associated with a node corresponding to a particular geographic region.

* * * * *